(12) United States Patent
Glacki et al.

(10) Patent No.: US 12,129,197 B2
(45) Date of Patent: Oct. 29, 2024

(54) APPARATUS AND METHOD FOR PRODUCING GLASS RIBBONS

(71) Applicant: SCHOTT AG, Mainz (DE)

(72) Inventors: Alexander Glacki, Mainz (DE); Christian Breitbach, Darmstadt (DE); Holger Hunnius, Mainz (DE); Ulrich Lange, Mainz (DE); Wolfgang Münch, Budenheim (DE); Gregor Rösel, Ginsheim-Gustavsburg (DE); Holger Wegener, Alfeld (DE)

(73) Assignee: SCHOTT AG, Mainz (DE)

( * ) Notice: Subject to any disclaimer, the term of this patent is extended or adjusted under 35 U.S.C. 154(b) by 116 days.

(21) Appl. No.: 16/938,092

(22) Filed: Jul. 24, 2020

(65) Prior Publication Data

US 2021/0024399 A1    Jan. 28, 2021

(30) Foreign Application Priority Data

Jul. 24, 2019    (DE) .................... 10 2019 120 064.4

(51) Int. Cl.
    *C03B 17/06*    (2006.01)
(52) U.S. Cl.
    CPC .......... *C03B 17/061* (2013.01); *C03B 17/067* (2013.01); *C03B 17/068* (2013.01)
(58) Field of Classification Search
    CPC ............ C03B 17/06; C03B 7/09; C03B 7/098
    See application file for complete search history.

(56) References Cited

U.S. PATENT DOCUMENTS

| | | | | |
|---|---|---|---|---|
| 1,565,319 A | * | 12/1925 | Fowle | .................... C03B 17/064 65/327 |
| 1,829,639 A | * | 10/1931 | Ferngren | ............... C03B 17/064 65/195 |

(Continued)

FOREIGN PATENT DOCUMENTS

| | | | | |
|---|---|---|---|---|
| CN | 103663927 A | * | 3/2014 | ............. C03B 5/225 |
| CN | 104302584 | | 1/2015 | |

(Continued)

OTHER PUBLICATIONS

Ralston K.D.et al, Revealing the relationship between grain size and corrosion rate of metals, Aug. 24, 2010, Scripta Materialia 63, 1201-1204 (Year: 2010).*

(Continued)

*Primary Examiner* — Alison L Hindenlang
*Assistant Examiner* — Steven S Lee
(74) *Attorney, Agent, or Firm* — Ruggiero McAllister & McMahon LLC (57) ABSTRACT

An apparatus is provided for producing thin glass ribbons from molten glass. The apparatus includes a drawing tank, a direct heater, and an indirect heater. The drawing tank has a lower elongated nozzle opening through which the molten glass can exit downwards. The direct heater has one or more heating circuits operable to heat the drawing tank in a first heating zone. The direct heater has a power source for each on the heating circuits. Each heating circuit has connections to connected to a wall of the drawing tank so that current from the power source flows through at least a portion of the wall and heats the wall. Each heating circuit also includes current-carrying portions of the wall. The indirect heater has one or more heating elements to heat the drawing tank in a second heating zone.

20 Claims, 5 Drawing Sheets

(56) References Cited

U.S. PATENT DOCUMENTS

| | | | | |
|---|---|---|---|---|
| 1,853,842 A * | 4/1932 | Bates | | C03B 7/098 65/327 |
| 2,179,224 A * | 11/1939 | Soubier | | C03B 7/01 373/40 |
| 3,080,737 A * | 3/1963 | Gell | | C03B 7/098 65/327 |
| 3,506,429 A * | 4/1970 | Overman | | C03B 17/064 65/203 |
| 3,607,182 A * | 9/1971 | Leibowitz | | C03B 17/064 65/195 |
| 3,682,609 A * | 8/1972 | Dockerty | | C03B 17/064 65/327 |
| 4,027,091 A * | 5/1977 | Pieper | | H05B 3/0023 373/41 |
| 4,247,733 A * | 1/1981 | Stevenson | | H05B 3/0023 373/41 |
| 4,268,296 A * | 5/1981 | Pfaender | | C03B 17/068 65/327 |
| 4,389,725 A * | 6/1983 | Barkhau | | H05B 3/0023 373/40 |
| 4,525,194 A * | 6/1985 | Rudoi | | C03B 17/04 65/195 |
| 7,013,677 B2 * | 3/2006 | Singer | | C03B 5/26 65/327 |
| 8,042,361 B2 * | 10/2011 | Pitbladdo | | G05D 7/0635 65/195 |
| 8,490,432 B2 * | 7/2013 | Berkey | | G05B 21/02 65/29.21 |
| 9,233,869 B2 * | 1/2016 | Pitbladdo | | C03B 17/064 |
| 9,242,887 B2 * | 1/2016 | Gromann | | C03B 7/098 |
| 9,284,209 B2 * | 3/2016 | Filippov | | C03B 17/064 |
| 2001/0038929 A1 * | 11/2001 | Uhlik | | G11B 5/8404 428/846.9 |
| 2004/0065115 A1 * | 4/2004 | Mueller | | C03B 17/064 65/29.21 |
| 2004/0067369 A1 * | 4/2004 | Ott | | C03C 3/085 427/372.2 |
| 2004/0154336 A1 * | 8/2004 | Pitbladdo | | C03B 17/064 65/195 |
| 2006/0144089 A1 * | 7/2006 | Eichholz | | C03B 5/235 65/29.21 |
| 2007/0064763 A1 * | 3/2007 | Hunnius | | H05B 7/12 65/135.7 |
| 2007/0140311 A1 * | 6/2007 | House | | C03B 17/064 65/29.21 |
| 2007/0271963 A1 | 11/2007 | Lange | | |
| 2008/0184741 A1 * | 8/2008 | Mueller | | C03B 17/064 65/184 |
| 2008/0282736 A1 * | 11/2008 | Filippov | | C03B 17/064 65/203 |
| 2011/0317329 A1 * | 12/2011 | Letz | | C03C 3/091 361/321.5 |
| 2012/0318020 A1 * | 12/2012 | Delia | | C03B 17/067 65/83 |
| 2013/0133367 A1 | 5/2013 | Abramov | | |
| 2013/0305784 A1 * | 11/2013 | Gromann | | C03B 17/04 65/29.14 |
| 2014/0319405 A1 | 10/2014 | Kijima | | |
| 2014/0352359 A1 * | 12/2014 | Yu | | C03B 17/064 65/184 |
| 2018/0334405 A1 * | 11/2018 | Buellesfeld | | C03B 17/064 |
| 2019/0144324 A1 * | 5/2019 | De Angelis | | C03B 13/04 65/90 |
| 2019/0152825 A1 * | 5/2019 | Fournel | | C03B 17/064 |

FOREIGN PATENT DOCUMENTS

| | | | | |
|---|---|---|---|---|
| CN | 104302584 A * | 1/2015 | | C03B 17/064 |
| CN | 104379516 | 2/2015 | | |
| CN | 108947218 | 12/2018 | | |
| DE | 506472 | 9/1930 | | |
| DE | 1596484 | 10/1971 | | |
| DE | 1596484 B1 * | 10/1971 | | C03B 17/064 |
| DE | 4440702 A1 * | 7/1996 | | C03B 5/167 |
| DE | 19809878 A1 * | 9/1999 | | C03B 7/086 |
| DE | 19948634 A1 * | 4/2001 | | C03B 5/185 |
| DE | 19964043 A1 * | 7/2001 | | C03B 17/064 |
| DE | 10064977 | 10/2002 | | |
| DE | 10064977 C1 * | 10/2002 | | C03B 17/06 |
| DE | 102004007560 A1 * | 9/2005 | | C03B 17/06 |
| DE | 102004007560 | 2/2006 | | |
| DE | 102004007560 B4 * | 2/2006 | | C03B 17/06 |
| DE | 20321430 | 4/2007 | | |
| DE | 20321430 U1 * | 5/2007 | | C03B 17/04 |
| GB | 292448 A * | 6/1928 | | C03B 17/061 |
| JP | H02217327 | 8/1990 | | |
| JP | H02217327 A * | 8/1990 | | C03B 17/064 |
| JP | 2001318191 A * | 11/2001 | | C03B 5/26 |
| JP | 2007091503 | 4/2007 | | |
| JP | 2007091503 A * | 4/2007 | | C03B 13/02 |
| JP | 2011102207 | 5/2011 | | |
| JP | 2012509845 A * | 4/2012 | | C03B 17/14 |
| JP | 2013035724 | 2/2013 | | |
| JP | 6036192 B2 * | 11/2016 | | |
| JP | 2019011237 | 1/2019 | | |
| JP | 6500679 | 4/2019 | | |
| JP | 6500679 B2 * | 4/2019 | | C03B 5/23 |
| JP | 2019514831 | 6/2019 | | |
| KR | 20160023631 A * | 12/2017 | | C03B 17/06 |
| WO | 2005035453 | 4/2005 | | |
| WO | 2005110934 | 11/2005 | | |
| WO | WO-2005110934 A2 * | 11/2005 | | C03B 17/064 |
| WO | 2008140682 | 11/2008 | | |
| WO | WO-2011090893 A1 * | 7/2011 | | C03B 17/064 |
| WO | 2013054432 | 4/2013 | | |
| WO | 2013082360 | 6/2013 | | |
| WO | WO-2013082360 A1 * | 6/2013 | | C03B 17/064 |
| WO | WO-2015026615 A1 * | 2/2015 | | C03B 17/064 |
| WO | 2016158435 | 10/2016 | | |
| WO | WO-2016158435 A1 * | 10/2016 | | C03B 17/06 |
| WO | WO-2017087183 A2 * | 5/2017 | | C03B 17/064 |
| WO | WO-2017087738 A1 * | 5/2017 | | C03B 17/064 |
| WO | WO-2018079810 A1 * | 5/2018 | | C03B 5/235 |
| WO | WO-2018098119 A1 * | 5/2018 | | C03B 17/064 |
| WO | 2020104497 | 5/2020 | | |
| WO | WO-2020104497 A1 * | 5/2020 | | C03B 17/061 |

OTHER PUBLICATIONS

Li, "Introduction to Flat Panel Display Glass Technology", Edited by Li Qing.—Shijiazhuang: Hebei Science and Technology Press, 2017. 6 ISBN 978-7-5375-8882-9, with English translation.

Gölitzer, "Fine-grain stabilized platinum materials for high-temperature applications", The Wayback Machine—https://web.archive.oi'g/web/20l fi080519410 1/http://pcm.uinicoie.coin:80/en/ . . . , Sep. 2001, with English translation.

* cited by examiner

APPARATUS AND METHOD FOR PRODUCING GLASS RIBBONS

CROSS REFERENCE TO RELATED APPLICATIONS

This application claims benefit under 35 USC § 119 of German Application 10 2019 120 064.4 filed Jul. 24, 2019, the entire contents of which are incorporated herein by reference.

BACKGROUND

1. Field of the Invention

The invention generally relates to glass manufacturing. More particularly, the invention relates to an apparatus and to a method for producing glass ribbons, in particular with a thickness of up to 3000 µm (micrometers), preferably from 15 to 1100 µm, from a molten glass in a down-draw process.

2. Description of Related Art

In a down-draw process, a drawing tank provides for equalization of the glass distribution down to a nozzle opening through which the glass exits at the hot-forming temperature. At the drawing tank outlet, a simple slot nozzle may be provided, and additionally a separate flow resistance may be provided inside the drawing tank itself or at the outlet of the drawing tank, for example in the form of a blade or fin-like body. All forming tools are preferably made of noble metal alloys, preferably with a high proportion of platinum. This gives the down-draw process a high degree of flexibility, because once the process is stopped, the noble metal tools can be exchanged and can subsequently be reused. For a ceramic trough that is used in overflow fusion processes, for example, this would not be economical, since heating-up and cooling-down times are correspondingly long. For example, the start-up process in an overflow fusion process takes more than a week, whereas it takes less than a day in a down-draw process.

Moreover, the same noble metal tool can be used for several types of glass that differ greatly in their chemical and physical properties, such as in terms of corrosion behavior, conductivity, density, viscosity profile, glass transition temperature, hot forming temperature, etc. That means, a down-draw process easily allows to flexibly re-melt types of glass without having to change the hot forming tools.

DE 10 2004 007 560 B4 is based on the object of providing an apparatus and a suitable drawing tank for producing thin glass sheets, which makes it possible to produce a glass ribbon that meets high requirements with regard to consistent thickness and flatness. This is achieved by a drawing tank which comprises at least two portions of different cross-sectional areas over the entire width, the portions being dimensioned such that the overall pressure drop over the distance covered by the molten glass in both portions is constant and equal at any point of the slot nozzle.

Furthermore, DE 10 2004 007 560 B4 describes that it is advantageous for the drawing tank to be equipped with heating elements in order to adjust an optimum temperature distribution, and in this case the drawing tank is heated only indirectly.

Furthermore, attempts have been made in the past to improve the quality of the glass sheet through special temperature profiles in the vicinity of the nozzle perpendicular to the drawing direction. For this purpose, it has been proposed in DE 100 64 977 C1, for example, to configure the inlet, drawing tank, and nozzle system as a closed system, with the inlet comprising a circular pipe with symmetrical pipe sections and the drawing tank comprising a heating system that is segmented in the vertical and transverse directions, and wherein the heating may be implemented in the form of direct or indirect electrical heating.

The drawing tank is a complex component in which the glass distribution, homogenization, and temperature adjustment have to be fine-tuned in order to optimize the geometric properties of the glass ribbon to be produced so as to avoid thickness variations, warping in the glass ribbon and glass defects, such as in particular streaks, etc.

The invention is therefore based on the object to provide an apparatus for producing glass ribbons, which allows to produce glass ribbons that meet the high requirements in terms of shape accuracy and dimensional consistency of the glass ribbon and glass quality while avoiding glass defects, and in terms of mechanical stability in order to extend the service life thereof. Furthermore, it is intended to specify a respective improved and in particular especially flexible method for more stable processing and increased yield.

Accordingly, the invention provides an apparatus for drawing glass ribbons, in particular with a thickness of equal to or less than 3000 µm, preferably from 15 to 1100 µm, from a molten glass, wherein the apparatus comprises a drawing tank which has a lower elongated nozzle opening through which the molten glass can exit downwards, and which comprises a direct heater and an indirect heater. Preferably, at least one direct heater and at least one indirect heater are located in nozzle zone or at the nozzle.

The direct heater comprise at least one heating circuit that is operable to heat at least one area of the drawing tank in the form of at least one first heating zone, wherein the direct heater comprise a respective power source for each heating circuit, wherein each heating circuit has connections through which each heating circuit is connected to a wall of the drawing tank so that the current from each power source flows through at least a portion of the wall and heats the wall, and wherein each heating circuit of the direct heater includes current-carrying portions of the wall of the drawing tank. Preferably, the direct heater comprises several heating circuits that are operable to heat several areas of the drawing tank in the form of several first heating zones.

The indirect heater comprises heating elements for at least one second heating zone, preferably several second heating zones.

In this way, the indirect heating of the drawing tank generates a basic temperature and the direct heating of the drawing tank generates the target temperature.

In a preferred embodiment, the direct heater comprises at least four separately controllable heating circuits which are operable to heat four different areas of the drawing tank in the form of four first heating zones. The direct heater comprise connections for each of the four heating circuits, through which the heating circuits are connected to the wall of the drawing tank, so that the current from the power sources flows through at least a portion of the wall and heats the wall and the heating circuits of the direct heating comprise current-carrying portions of the wall of the drawing tank, wherein the heating circuits are in particular established involving current-carrying metal sheets of the drawing tank.

The indirect heater preferably comprises heating elements for at least three separately controllable spatially distinct second heating zones.

The thickness of the glass ribbon is very sensitive to temperature deviations, so optimization and fine adjustment of the temperature of the molten glass in and on the drawing tank is particularly important for a stable production process.

If a heating system is only implemented indirectly, i.e. the heating elements are arranged around the drawing tank, temperature control will be subject to latency and fine-tuning or optimization of the temperature profile in the drawing tank in transverse and longitudinal directions is difficult. Gradient control and thus better and faster controllability to compensate for inhomogeneities in the flow in order to increase melt quality and to adjust the thickness profile is difficult. Moreover, start-up and stopping processes can only be effected slowly in the latency system.

If a heating system is only implemented directly, electrochemical reactions between the molten glass and the metal sheet of the drawing tank may be promoted in the case of excessive direct heating amperages, which might cause bubble formation in the glass and the generation of undesirable particles from the metal sheets of the drawing tank. Furthermore, it is not possible to implement finely spatially resolved temperature adjustments if the component is only directly heated, which prevents controllability of the process.

The specific combination of the invention including the direct heater and the indirect heater allows to mitigate or mutually compensate the drawbacks of the respective way of heating. Thus, the direct heater allow to quickly regulate the glass temperature by ±0.5 K and to quickly start and stop the process, and at the same time the indirect heater allow to prevent or at least reduce excessive heating amperages in the direct heating and thus the undesirable formation of bubbles and particles in the glass. The separation into distinct first and second heating zones allows to better adjust the linear throughput of molten glass, i.e. the throughput of molten glass per unit length in the transverse direction.

Thus, the apparatus according to the invention for producing thin glass ribbons offers a heating system which is improved compared to the prior art, with particularly flexible temperature and throughput adjustment in the drawing tank, and thus allows to produce glass ribbons with improved shape accuracy, dimensional consistency and glass quality.

In order to further improve the controllability of the indirect heater, the indirect heater preferably comprise heating elements for five or more separately controllable second heating zones.

In an advantageous embodiment, the first heating zones of the direct heater and the second heating zones of the indirect heater are arranged on and around the drawing tank in a vertically and/or horizontally distributed manner.

The vertical and/or horizontal distribution into different heating zones allows to regulate the temperature profile and linear throughput of the molten glass in a spatially resolved optimal manner, which is beneficial in terms of controllability and thus stability of the process. Also, a negative pressure in the drawing tank is prevented in this way, for example, which might cause deformations or even process failure.

What can also be problematic is the aging of the material of the drawing tank, of the forming tools, or of other components during a long service life and under the high temperatures of more than 1200° C., which may adversely affect stability, for example as a result of grain size growth in a component even if it is made of noble metal. These drawbacks can be avoided by the combination of direct and indirect heater with the vertical and/or horizontal distribution into different heating zones.

The heating currents applied to the metal sheets of the drawing tank for direct heating are preferably less than 2500 A, more preferably less than 1000 A. With heating currents of less than 2500 A, preferably less than 1000 A, the formation of particles is reduced, in particular the formation of noble metal particles from noble metal components as well as the formation of bubbles in the glass.

The indirect heater is preferably designed so as to contribute more than 50% to the total power output, as a base load. If the heat supply via the indirect heater outweighs that of the direct heater, this allows to bring the control current of the direct heating to amperages, i.e. current levels which are below the current levels that are critical for particle and bubble formation.

In order to improve the direct heater in terms of heat technology, an advantageous embodiment of the drawing tank comprises flanges or collars as the power source connections for direct heating.

It has been found that an advantageous thickness of the current-carrying metal sheets of the drawing tank is in a range from 0.5 to 5 mm, in a locally adapted way, to optimally adjust local current densities, i.e. the heat input as a function of amperage and conductor cross section. By adapting the material thickness for the respective ideal temperature distribution for set current levels, it is possible to reduce critical areas such as local hot spots which might arise at kinks or flanges of the drawing tank under direct heating, and so the formation of bubbles and foreign particles can be avoided.

Particularly rapid and direct adjustability is made possible by the fact that preferably a plurality of temperature measurement points are positively connected to the drawing tank, in particular welded thereto.

In a further advantageous embodiment, at least two temperature measurement points are provided, which are feedback control measurement points for regulating the heating power of the direct heater or of the indirect heater for a feedback control unit for controlling the heating power output.

For a particularly uniform heat distribution, the indirect heater may comprise heating tiles or meandering heaters as the heating elements.

Heating elements comprising platinum, stainless steel, or SiC as a resistance heating material have been found to be particularly advantageous for the indirect heater.

In order to prevent creep deformation when a component is subjected to stress for example due to high temperatures, and in order to increase processing stability and the service life of the apparatus, it is contemplated according to a preferred embodiment that the drawing tank comprises metal sheets comprising at least one fine grain stabilized noble metal or one fine grain stabilized noble metal alloy. Platinum and platinum alloys are particularly suitable as the metals, in particular Pt, PtRh, PtAu, PtRhAu, PtIr, and particularly preferably they contain nanoparticles such as $ZrO_2$ particles.

The use of fine grain stabilized noble metal alloys is preferred in order to increase the stability of the drawing tank under high temperature loads and long-term use. Fine grain stabilized alloys, optionally with added nanoparticles, melt metallurgically or powder metallurgically produced noble metal alloys made of $Pt_xRh_yAu_z$ (0%≤x≤100%, 0%≤y≤20%, 0%≤z≤20%) or $Pr_uIr_v$ alloys (0%≤u≤100%, $0 \le v \le 20\%$) are particularly advantageous for reducing the creep effect when components are exposed to high temperature loads.

Suppliers of such stabilized materials include, e.g., Umicore, Furuya, Heraeus, Tanaka, each with their own versions of such materials (Umicore e.g. PtRh10 FKS Rigilit, PtRh10 FKS Saeculit; Heraeus e.g. PtRh10 DPH or DPH-A).

Highly creep-resistant noble metals such as pure iridium are less suitable because they are not oxidation resistant.

Without being limited to the specific alloys mentioned above, the arrangement described herein generally allows to draw glass ribbons from glasses at forming temperatures above 1100° C. Within the present disclosure, forming temperature refers to a temperature at which the glass has a viscosity of $10^4$ dPa·s.

Not only the metal sheets of the drawing tank but, as a matter of course, also other components or tools of the apparatus may comprise at least one fine grain stabilized noble metal or fine grain stabilized noble metal alloy.

In order to avoid a negative pressure in the drawing tank, which might result in mechanical deformation of the drawing tank and lead to inhomogeneous thicknesses of the glass ribbon and glass defects, an inlet upstream of the drawing tank preferably opens into a manifold pipe of the drawing tank which opens into a chamber, which chamber has a smaller cross section than the manifold pipe and has the nozzle opening at its lower end.

Thus, the total pressure drop across the distance covered by the molten glass is constant and equal at any point of the nozzle opening.

In a preferred embodiment, the power sources of the direct heater are connected to the drawing tank in such a way that at least three first heating zones are defined, which are distributed in the upper portion of the drawing tank transversely to the drawing direction of the glass ribbon, i.e. in particular along the longitudinal extension of the nozzle opening, and one of the first heating zones is preferably arranged centrally and a further first heating zone heats the lower portion of the drawing tank that includes the nozzle opening.

This arrangement allows to control the temperature in the drawing tank down to the nozzle opening in a locally variable manner, namely in both the horizontal and vertical directions, and hence to adjust the viscosity of the molten glass as desired.

According to a further preferred embodiment, and in order to further improve temperature control, the heating elements for the at least three separately controllable spatially distinct second heating zones are arranged such that the second heating zones are distributed next to one another transversely to the drawing direction of the glass ribbon, i.e. in particular along the longitudinal extension of the nozzle opening.

As a result, a glass ribbon can be produced that meets high requirements in terms of consistent thickness and flatness.

For an extended dwell time of the molten glass and for improved controllability of the temperature to influence the thickness distribution (longitudinal and transverse distributions) of the molten glass, the drawing tank of the apparatus preferably includes a guiding body which protrudes downward out of the nozzle opening of the drawing tank, wherein the guiding body is supported so as to be spaced apart from the edges of the nozzle opening so that two nozzle slots are defined between the guiding body and the edges of the nozzle opening. Preferably, the guiding body is heated, in which case the guiding body has its own separately controllable connections and at least one heating circuit independent of the drawing tank is provided, with grounding implemented through one connection thereof, for example.

The aforementioned structural implementations of the apparatus permit to achieve higher yields of glass ribbons with homogeneous thickness and improved surface quality, and also improve mechanical stability and hence also the service life thereof.

An apparatus as described above preferably allows to perform a method for producing thin glass ribbons, in particular with a thickness of equal to or less than 3000 µm, in which the molten glass is fed to the drawing tank via an inlet, and wherein the molten glass emerges from the nozzle opening and is drawn off to form the glass ribbon, which comprises heating the drawing tank simultaneously using both the direct heater and the indirect heater.

In a preferred method, the molten glass is distributed via the inlet to the drawing tank into a manifold pipe of the drawing tank, which opens into a chamber, wherein the chamber has a smaller cross section than the manifold pipe, wherein a consistent linear throughput of molten glass along the nozzle opening is adjusted through the temperature profile in the drawing tank, that means a constant throughput per unit length in the transverse direction of the molten glass.

In a preferred method, the direct heater and the indirect heater are used to control the linear throughput of the molten glass, i.e. the throughput per unit length in the transverse direction of the molten glass through temperature adjustment and temperature distribution of the molten glass in the drawing tank in such a way that the total throughput is kept constant.

In the round inlet to the drawing tank, throughput is adjusted as a function of pipe diameter and temperature. The temperature adjustment of the drawing tank should preferably only have an impact on the distribution of the linear throughput along the outlet and should not alter the overall throughput.

In a further preferred method that uses an apparatus in which the drawing tank comprises a chamber in which a guiding body is arranged and which has the nozzle opening at its lower end, the temperature of the molten glass in the drawing tank is preferably adjusted such that with the temperature-dependent viscosity η thereof the following relationship is fulfilled:

$$48 \frac{\dot{v}}{B} \int_{H_L} \frac{\eta}{(D_S - D_L)^3} dz + 12 \frac{\dot{v}}{B} \int_{H_S} \frac{\eta}{D_S^3} dz > \rho \cdot g \cdot h - p_u$$

wherein $\dot{v}$ is the volume flow of the molten glass, B is the width of the drawing tank in the direction along the nozzle opening, $D_S$ is the local width of the chamber, $D_L$ is the local thickness of the guiding body, ρ is the density of the molten glass, g is the gravitational acceleration, h is the height of the chamber, and $p_u$ is a pressure of 2000 Pa.

For producing glass ribbons with a largest possible width and uniform thickness, a temperature gradient of advantageously $T_{grad} = T_{center} - T_{edge} = 0$ to 50 K, preferably $T_{grad} = 20$ to 40 K is adjusted in the drawing tank along the nozzle opening from the edges to the center of the nozzle opening.

The aforementioned embodiments of the method involving both direct heating and indirect heating allow to achieve particularly stable processes and thus higher yields of glass ribbons with homogeneous thickness and improved surface quality in a flexible way. This also enhances the economics of the method.

BRIEF DESCRIPTION OF THE FIGURES

The invention will now be explained in more detail with reference to the accompanying figures, wherein.

DETAILED DESCRIPTION

Figure 1:
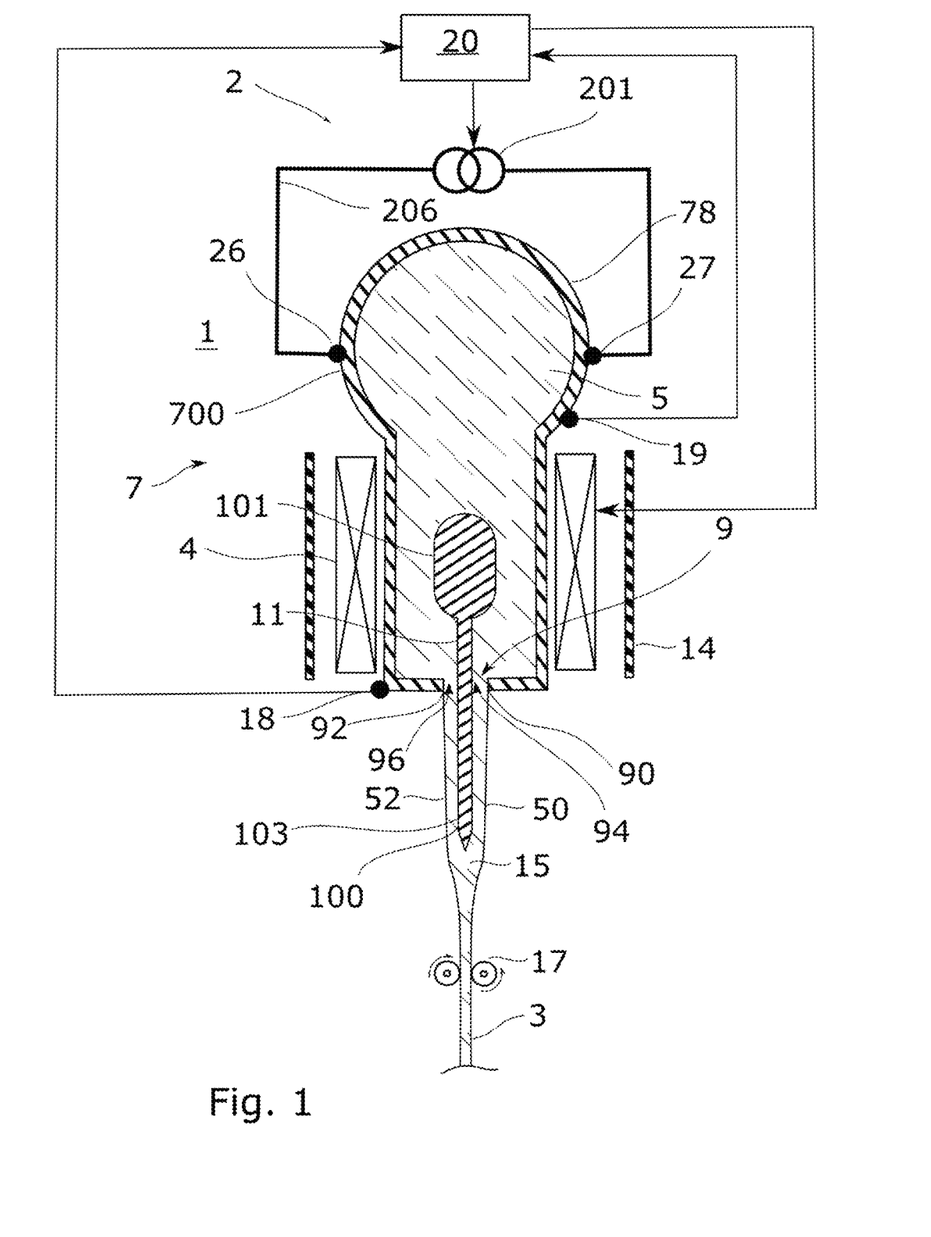
FIG. 1 is a cross-sectional view through a drawing tank with direct heater, indirect heater, and a guiding body.

FIG. 1 shows parts of an apparatus 1 for producing, in particular drawing, glass ribbons 3 from a molten glass 5, in particular with a thickness equal to or less than 3000 µm, preferably from 15 to 1100 µm. The apparatus 1 comprises a drawing tank 7 for holding molten glass 5, which has an elongated nozzle opening 9 at its lower end, through which the molten glass 5 can exit downwards, combined with direct heater 2 and indirect heater 4 according to the invention.

Preferably, a guiding body 11 may be arranged inside the drawing tank 7 and may protrude downward out of the nozzle opening 9 of the drawing tank 7. The guiding body 11 is preferably supported so as to be spaced apart from the edges 90, 92 of the nozzle opening 9, so that two nozzle slots 94, 96 are defined between the guiding body 11 and the edges 90, 92 of the nozzle opening 9. Therefore, the molten glass 5 preferably emerges from the nozzle slots 94, 96 in two substreams 50, 52. These substreams 50, 52 can run down along the guiding body 11 and combine at the lower end of the portion 100 of the guiding body 11, which preferably protrudes from the nozzle opening 9. This region in which the two substreams 50, 52 unite and from which the glass ribbon 3 is formed by being drawn off is referred to as a drawing onion 15. While being drawn off, the thickness of the glass ribbon 3 reduces by the drawing of the glass. At the same time, the glass becomes colder with growing distance from the nozzle opening 9, and accordingly becomes more viscous until it solidifies.

It is generally preferred for the guiding body 11 to protrude from the nozzle opening 9 by at least 30 mm, preferably at least 80 mm. This ensures good distribution of the molten glass 5 on the guiding body 11, so that variations in thickness of the glass ribbon 3 are prevented.

Without being limited to a specific exemplary embodiment, it is contemplated according to a further embodiment that the guiding body 11 has a greater thickness inside the drawing tank 7 than at the nozzle opening 9. The thickening is advantageous for mechanical reasons, but is not mandatory.

The guiding body 11 may comprise a resistance body 101 and a fin or blade 103 arranged below the resistance body 101, and the resistance body 101 preferably has a greater width than the blade 103 in order to restrict the flow cross section in the drawing tank 7.

Generally, the distance from the nozzle opening 9 to the lower edge of the flow resistance or resistance body 101 is preferably at least 3 mm, more preferably at least 8 mm.

What is not shown in FIG. 1, but technically conceivable as well is to heat the guiding body 11, in particular via dedicated separately controllable connections, so that at least one separate heating circuit independent of the drawing tank 7 is established and is grounded via one connection, for example.

For drawing off the glass ribbon 3, a drawing device 17 may be provided, which may comprise one or more pairs of driven rollers, for example.

FIG. 1 shows one heating circuit 206 of the direct heater 2, which has two connections 26, 27 through which the heating circuit 206 is connected to a wall 700 of the drawing tank 7, so that the current from power source 201 flows through at least a portion of the wall 700 and heats the wall 700, so that at least a portion of the drawing tank 7 can be heated, in the form of a first heating zone 34.

Figure 2:
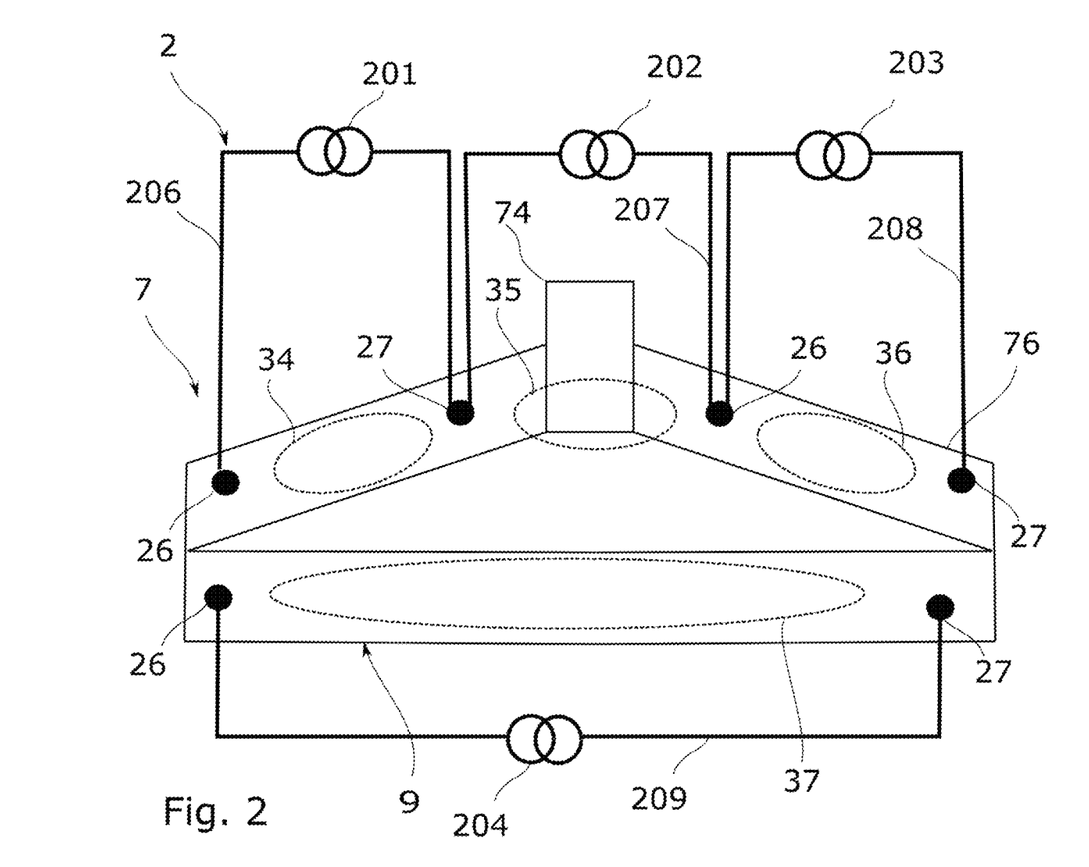
FIG. 2 schematically shows a section of a drawing tank with direct heater in a cross-sectional view.

The direct heater 2 preferably comprise at least four separately controllable heating circuits 206, 207, 208, 209 which are operable to heat four different areas of the drawing tank 7 in the form of first heating zones 34, 35, 36, 37, as shown in FIG. 2, for example.

The direct heater 2 further comprise a respective power source 201, 202, 203, 204 for each of the preferably at least four heating circuits 206, 207, 208, 209, the heating circuits 206, 207, 208, 209 each having connections 26, 27 through which the heating circuits 206, 207, 208, 209 are connected to the wall 700 of drawing tank 7 so that the current from power sources 201, 202, 203, 204 flows through at least a portion of the wall 700 and heats the wall 700.

The heating currents of a heating circuit are preferably less than 2500 A, in particular less than 1000 A. However, power sources with a minimum power output of 200 A are preferred in order to be able to provide sufficient heating power when direct heating is using for temperature readjustment. More particularly, the heating circuits 206, 207, 208, 209 of the direct heating are established involving current-carrying metal sheets 78 of the drawing tank 7. Favorable thicknesses of the metal sheets 78 for direct heating are in a range from 0.5 to 5 millimeters.

In addition to heater 2, the apparatus 1 also comprises indirect heater 4 including heating elements for at least one second heating zone, as shown in FIG. 1. In particularly preferred implementations, the indirect heater 4 comprise heating elements for at least three or for five or more (FIG. 3) separately controllable spatially distinct second heating zones. In the exemplary embodiment of the apparatus 1 according to FIG. 1, a thermal insulation 14 to the external environment is furthermore provided around the indirect heater 4.

As schematically illustrated in FIG. 1, at least two temperature measurement points 18, 19 are provided in an advantageous embodiment, which can provide control measurement points for regulating the heating power output of the direct heater 2 and/or of the indirect heater 4 for a control unit 20 for feed-back control of the heating power. As indicated by the arrows, the control unit 20 accordingly derives the sensor values from temperature measurement points 18, 19 and controls the heating power of the heater 2, 4. For direct heating, current flow is adjusted for this purpose. The indirect heater 4 preferably also involve conductive heating, but may also comprise burners, for example. The temperature measurement points 18, 19 may be positively connected to the drawing tank 7, in particular welded thereto, for rapid feedback of temperature changes.

For reasons of better clarity, FIG. 2 shows a section of a drawing tank 7 with direct heater 2 comprising preferably at least four separately controllable heating circuits 206, 207, 208, 209 which are operable to heat four different areas of the drawing tank 7 in the form of first heating zones 34, 35, 36, 37. The direct heater 2 according to FIG. 2 comprise a respective power source 201, 202, 203, 204 associated with each of the heating circuits 206, 207, 208, 209, each one with connections 26, 27 through which the heating circuits 206, 207, 208, 209 are connected to the wall 700 of the drawing tank 7.

In an advantageous embodiment, the first heating zones 34, 35, 36, 37 of direct heater 2 are arranged on the drawing tank 7 in a vertically and horizontally distributed manner. This arrangement makes it possible to control the temperature in the drawing tank down to the nozzle opening 9 in a locally variable distinct way so that the viscosity of the molten glass 5 can be adjusted as desired.

In a particularly preferred embodiment of the direct heater 2 as shown in FIG. 2, the power sources 201, 202, 203, 204 are connected to the drawing tank 7 in such a way that at least three first heating zones 34, 35, 36 are preferably distributed in the upper portion of the drawing tank 7 transversely to the drawing direction of the glass ribbon 3, that is in particular along the longitudinal extension of the nozzle opening 9. One heating zone 35 of these three first heating zones 34, 35, 36 in the upper portion of the drawing tank 7 is preferably arranged centrally in the vicinity of an inlet 74 for the molten glass 5 to the drawing tank 7, and each of the two further heating zones 34, 36 is preferably located in the region of a manifold pipe 76 for the molten glass 5 downstream of inlet 74. As illustrated in FIG. 2, at least one further first heating zone 37 advantageously heats the lower portion of the drawing tank 7 including nozzle opening 9.

Figure 3:
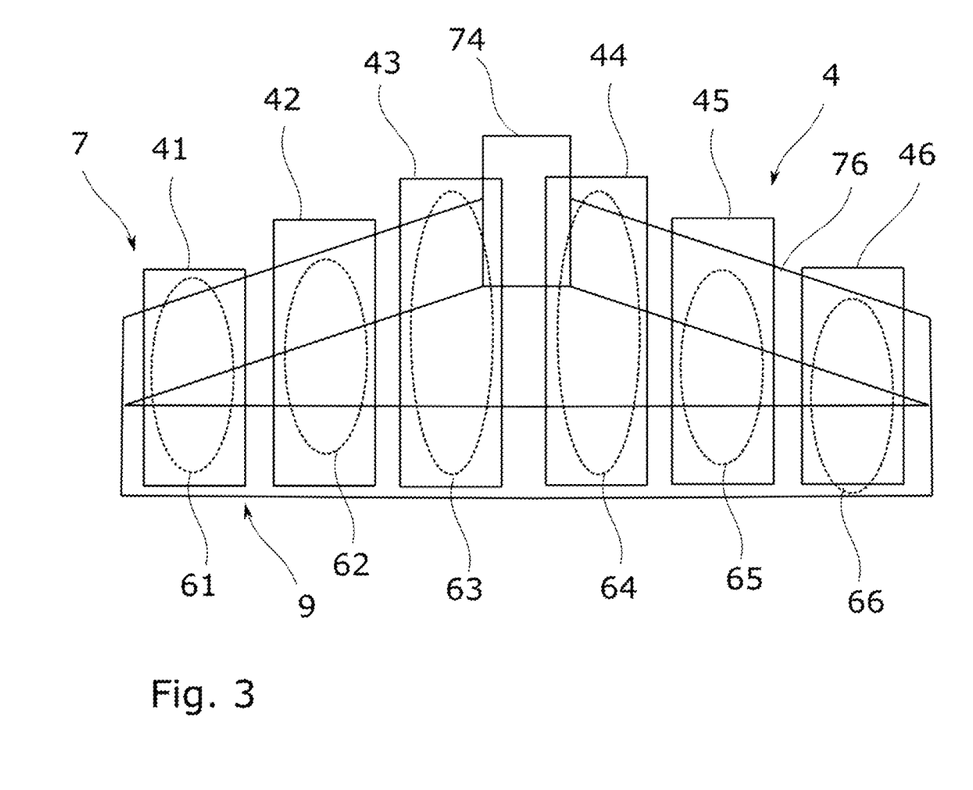
FIG. 3 schematically shows a section of a drawing tank with indirect heater in a cross-sectional view.

For reasons of better clarity, FIG. 3 shows a section of a drawing tank 7 with indirect heater 4.

Without being limited to the exemplary embodiments, it is contemplated according to one embodiment of the invention as shown in FIG. 3, that the indirect heater 4 preferably comprise six heating elements 41, 42, 43, 44, 45, 46 for six separately controllable second heating zones 61, 62, 63, 64, 65, 66, and the second heating zones 61, 62, 63, 64, 65, 66 of indirect heater 4 may extend vertically on the drawing tank 7, distributed next to one another, more preferably transversely to the drawing direction of the glass ribbon 5, that is in particular along the longitudinal extension of the nozzle opening 9.

Since the apparatus 1 of the invention for producing and in particular drawing glass ribbons 3 comprises direct heater 2 and at the same time indirect heater 4, it is possible to optimally adjust the temperature profile and linear throughput of the molten glass 5 in a spatially resolved manner, in particular due to the separation into distinct first and second heating zones, which especially promotes controllability and hence stability of the process performed with this apparatus. Such control makes it in particular possible to target a most consistent possible throughput along the nozzle opening 9.

Since the thickness of the glass ribbon is very sensitive to temperature deviations, optimization and fine adjustment of the temperature of the molten glass 5 is particularly important for a stable production process.

Figure 4:
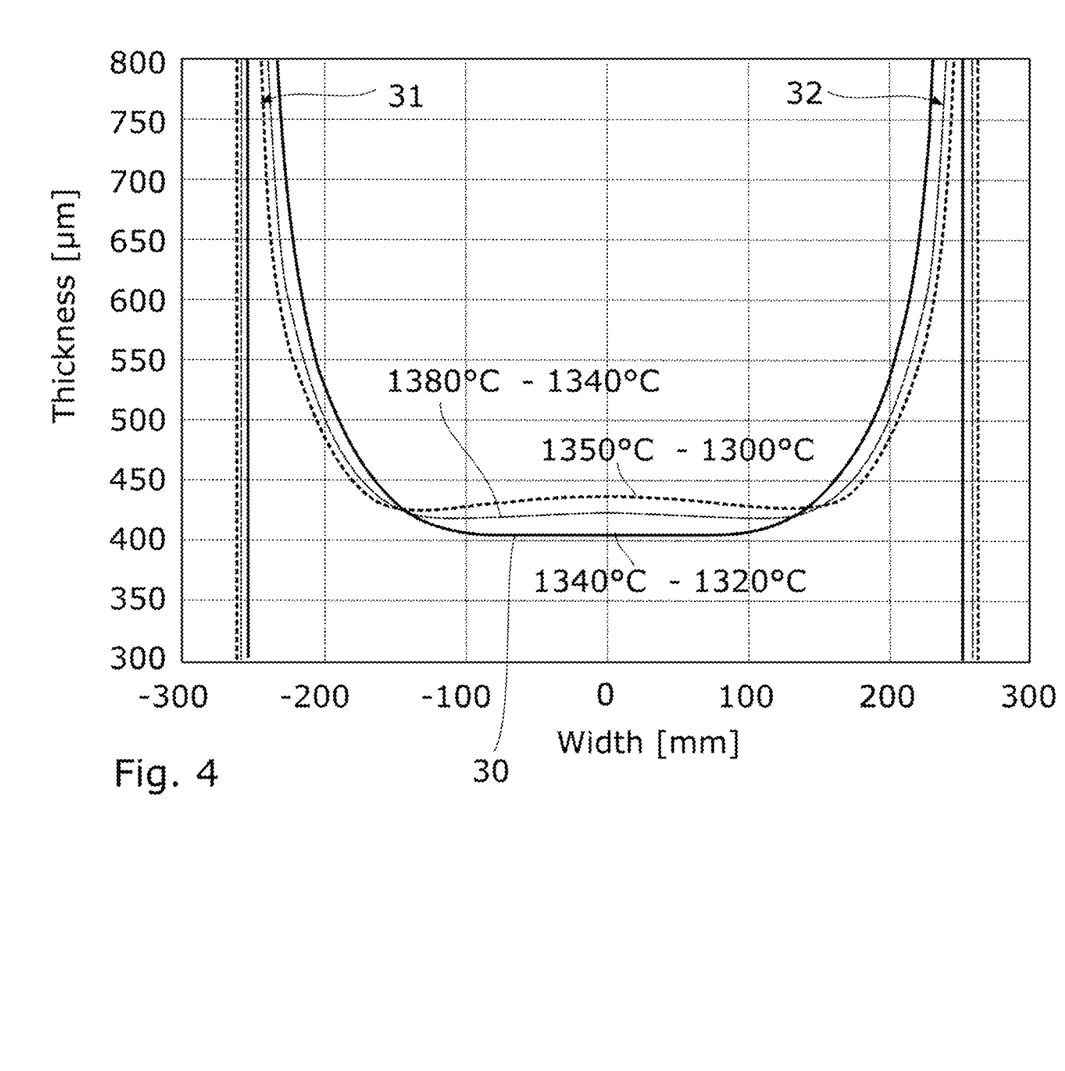
FIG. 4 is a graph showing the influence of the temperature profile at the drawing tank outlet on the thickness profile and the width of the glass ribbon.

FIG. 4 is a graph showing the influence of the temperature profile at the drawing tank outlet on the thickness profile and the width of the glass ribbon 3.

The glass ribbons 3 comprise a central area 30 along which the thickness of the glass ribbon 3 does not vary at all or only slightly, and beads 31, 33 on the edges. The central area 30 is what is known as the quality area from which the glass products to be manufactured are produced. Typically, the beads 31, 33 are severed and the glass of the beads can be re-melted and returned into the drawing tank 7.

In order to obtain a glass ribbon 3 of particularly large width and at the same time uniform thickness in the useful quality area or central area 30, a temperature gradient between the edges 90, 92 of the nozzle opening 9 and the center of the nozzle opening 9 should ideally be adjusted to amount to 40 K, as shown in FIG. 4 by the thin middle line of the three lines.

If the center of the nozzle opening 9 is hotter, i.e. if the temperature gradient is 50 K, for example, the linear throughput of molten glass 5 will increase in the center, which is why the thickness profile of the glass ribbon 3 will assume a letter W shape, as indicated by the dashed line in FIG. 4, for example.

If the temperature differential is less than or equal to 20 K, as indicated by the bold line in FIG. 4, the width of the glass ribbon 3 will decrease and the thickness profile will become trough-shaped. The useful quality area or central area 30 will be reduced significantly thereby.

Therefore, in order to produce glass ribbons 3 of a largest possible width with consistent thickness, a temperature gradient of advantageously $T_{grad}=T_{center}-T_{edge}=0$ to 50 K, preferably $T_{grad}=20$ to 40 K is preferably adjusted in the drawing tank 7 along the nozzle opening 9 from the edges 90, 92 thereof to the center of the nozzle opening 9.

Figure 5:
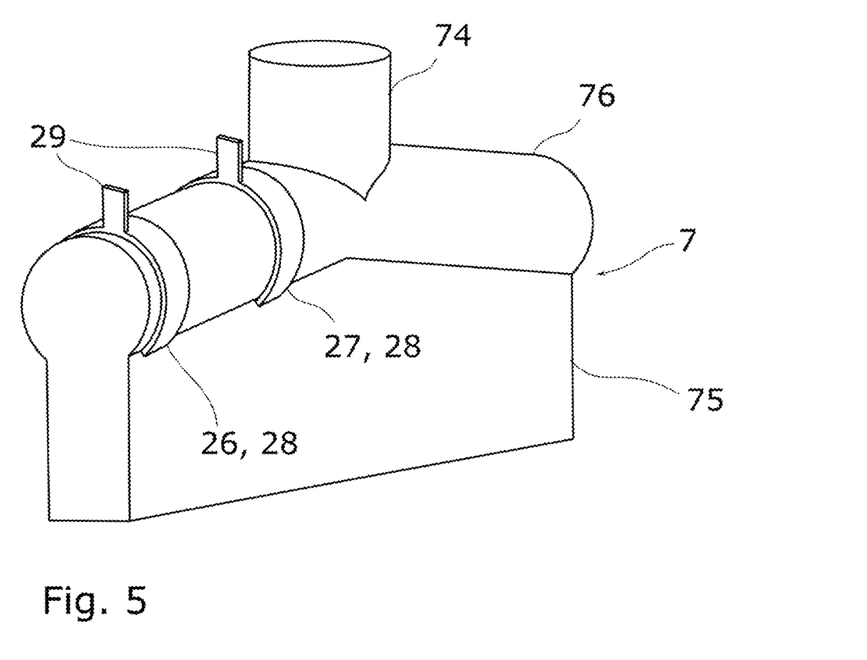
FIG. 5 is a perspective view of a drawing tank with a single pair of collars as the power connections for direct heating.

A further possibility for adjusting or controlling the thickness of the glass ribbon 3 by adjusting the temperature is implemented in an advantageous embodiment of the apparatus 1 comprising a drawing tank 7, in which the drawing tank 7 comprises flanges or collars 28 as the power connections 26, 27 for direct conductive heating.

FIG. 5 shows a section of a preferred embodiment, in which an inlet 74 for the molten glass is provided upstream of the drawing tank 7 and in which the upper portion of the drawing tank 7 is formed by a tubular section or manifold pipe 76 for the molten glass 5 which opens into a chamber 75. In this case, a single pair of collars 28 is fitted to the manifold 76 as the separate power connections 26, 27, for example. Each of the collars 28 preferably has a power connection tab 29.

Figure 6:
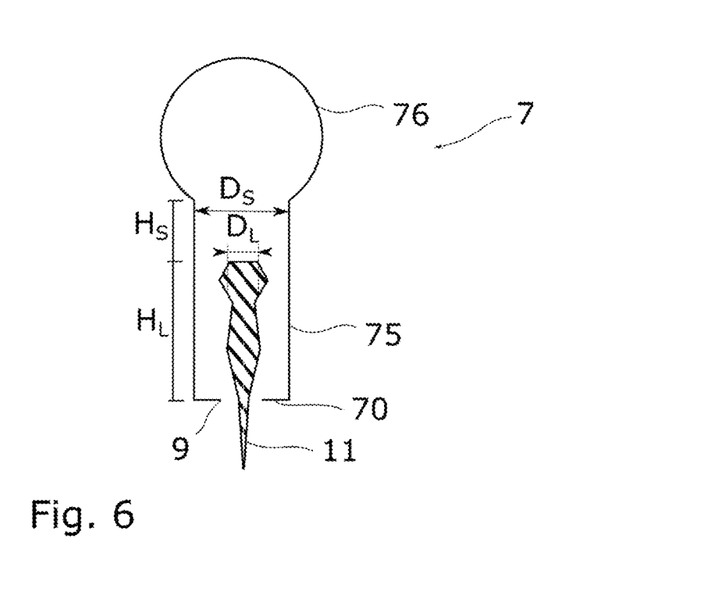
FIG. 6 is a cross-sectional view of a drawing tank for illustrating parameters for calculating the pressure drop in the drawing tank.

According to a further embodiment of the invention, the pressure drop in the drawing tank 7 is adjusted in a specific way in order to improve the shape accuracy and dimensional consistency of the glass ribbon 3. This adjustment prevents a negative pressure from developing in the drawing tank 7. Such negative pressure might mechanically deform the drawing tank 7, which may also affect the glass thickness. Moreover, a local negative pressure may cause an unstable flow pattern of the molten glass 5 in the drawing tank 7, which may also lead to an inhomogeneous glass thickness or to glass defects.

The adjustment according to this embodiment will now be explained in more detail with reference to the schematic sectional view of a drawing tank 7 in FIG. 6. FIG. 6 shows a cross-sectional view of a drawing tank 7 indicating dimensions which are used to calculate the pressure drop in the drawing tank 7.

Here, the upper portion of drawing tank 7 is formed by a tubular section or manifold pipe 76 that opens into a chamber 75 which extends down to a bottom 70 of the drawing tank 7. Chamber 75 preferably has a smaller cross section than the manifold pipe 76. Accordingly, the width $D_A$ of the chamber 75 is smaller than the diameter of the manifold pipe 76. Due to the small cross section, pressure changes will primarily occur along the chamber 75. Particular contributions come from the sections in which preferably at least one guiding body 11 further narrows the chamber 75.

According to a preferred embodiment, the temperature in the drawing tank 7 is adjusted such that the condition as already mentioned above is met:

$$48\frac{\dot{v}}{B}\int_{H_L}\frac{\eta}{(D_S-D_L)^3}dz + 12\frac{\dot{v}}{B}\int_{H_S}\frac{\eta}{D_S^3}dz > \rho \cdot g \cdot h - p_u$$

In the above relationship, $\dot{v}$ is the volume flow of the molten glass 5, B is the width of the drawing tank 7 in the direction along nozzle opening 9 or along the glass ribbon 3 perpendicular to the drawing direction, η is the viscosity of the molten glass 5, $D_S$ is the local width of chamber 75, $D_L$ is the local thickness of guiding body 11, p is the density of the molten glass 5, g is the gravitational acceleration, and h is the height of chamber 75. The integration is made over sections $H_L$ and $H_S$ in the vertical direction z. The integration may also be made over two or more sub-sections, in which case the sub-integrals then having to be added. This is the case if further guiding bodies are provided in addition to guiding body 11, which are for instance separated apart from one another in the vertical direction.

The symbol $p_u$ denotes a pressure magnitude of 2000 Pa. This magnitude accounts for a negative pressure that is still tolerable. Thus, the right side of the relationship represents the hydrostatic pressure of the molten glass reduced by the still tolerable negative pressure $p_u$. This term is a constant. The prefactor $\dot{v}/B$ defines the thickness of the glass ribbon 3 which is predetermined so that the prefactor also represents a constant. On the other hand, what can be controlled through the temperature for a given thickness of the glass ribbon 3 is the strongly temperature-dependent viscosity η.

As shown above by the implementations of direct heater 2 and indirect heater 4, the temperature can even be controlled in a locally differing manner. Also, the temperature in the drawing tank may vary along the vertical direction. Thus, the viscosity may be location-dependent, η=η(z). This dependency can accordingly also be taken into account in the integration.

It is thus contemplated according to one embodiment that the drawing tank 7 comprises a chamber 75 in which the guiding body 11 is arranged and which has the nozzle opening 9 at its lower end, and that the temperature of the molten glass 5 in the drawing tank 7 is adjusted such that the relationship given above is fulfilled with the temperature-dependent viscosity thereof.

It will be apparent to a person skilled in the art that the invention is not limited to the specific exemplary embodiments illustrated in the figures, but may be varied in various ways. Different embodiments may in particular also be combined with one another.

LIST OF REFERENCE NUMERALS

| 1 | Apparatus | 50, 52 | Substreams |
|---|---|---|---|
| 2 | Direct heater | 41-6 | Heating elements |
| 3 | Glass ribbon | 61-66 | Second heating zones |
| 4 | Indirect heater | 70 | Bottom |
| 5 | Molten glass | 74 | Inlet |
| 7 | Drawing tank | 75 | Chamber |
| 9 | Nozzle opening | 76 | Manifold pipe |
| 11 | Guiding body | 78 | Metal sheet |
| 14 | Thermal insulation | 90, 92 | Edges |
| 15 | Drawing onion | 94, 96 | Nozzle slot |
| 17 | Drawing device | 100 | Protruding guiding body portion |
| 18, 19 | Temperature measurement point | 101 | Resistance body |
| 20 | Control unit | 103 | Fin or blade |
| 26, 27 | Connections for heating circuit | 201-204 | Power source |
| 28 | Collar | 206-209 | Heating circuit |
| 29 | Power connection tab | 700 | Drawing tank wall |
| 30 | Central area of 3 | | |
| 31, 32 | Beads of 3 | | |
| 34-37 | First heating zones | | |

What is claimed is:

1. An apparatus for producing thin glass ribbons from a molten glass, the apparatus comprising:

a drawing tank having an inlet, a wall, a nozzle opening through the wall, and a manifold pipe in communication with the inlet, the inlet being configured to receive the molten glass into the drawing tank, the manifold pipe having an upper portion with a cylindrical cross-section that is transverse to a drawing direction of the glass ribbons and along a longitudinal extension of the nozzle opening, the manifold pipe being in communication with a chamber that has a smaller cross section than the manifold pipe, wherein the nozzle opening is at a lower end of the chamber, the nozzle opening being configured to allow the molten glass to exit the drawing tank and produce the thin glass ribbons with a thickness up to 3000 μm;

a direct heater having a heating circuit and a power source, the heating circuit defining a first heating zone to heat the drawing tank, the power source operatively connected to the heating circuit, the heating circuit having power connections that connect the heating circuit to the wall so that a current from the power source flows through a current-carrying portion of the wall to heat the wall; and an indirect heater having a heating element defining a second heating zone to heat the drawing tank, wherein the direct heater comprises at least three heating circuits defining three of the first heating zones, and wherein the three heating circuits are operatively connected to the power source so that the three heating circuits are separately controlled, the three heating circuit having different connections that connect the three heating circuit to different areas of the wall so that current from the power source flows through current-carrying portions of the wall to heat at least three different areas of the wall, which are distributed in the upper portion of the drawing tank, wherein one heating zone of the direct heater comprises a pair of collars that form the power connections and are fitted to the upper portion of the manifold pipe in the vicinity of the inlet for the molten glass.

2. The apparatus of claim 1, wherein the heating circuits defines four of the first heating zones operatively connected to the power source so that the four of the first heating zones are separately controlled, the four of the first heating zones having different connections that connect to different areas of the wall so that current from the power source flows through current-carrying portions of the wall to heat four different areas of the wall.

3. The apparatus of claim 1, wherein the heating element comprises three heating elements defining three of the second heating zones, the three heating elements being separately controllable and spatially distinct from one another.

4. The apparatus of claim 1, wherein the heating element comprises five heating elements defining five of the second heating zones, the five heating elements being separately controllable.

5. The apparatus of claim 1, wherein the heating element comprises a plurality of heating elements defining a plurality of the second heating zones, wherein the plurality of second heating zones are arranged on and around the drawing tank in a vertically and/or horizontally distributed manner.

6. The apparatus of claim 1, wherein the current is less than 2500 A.

7. The apparatus of claim 1, wherein the indirect heater contributes more than 50% of a total heating power output.

8. The apparatus of claim 1, wherein the current-carrying portion of the wall is made from metal sheets having a thickness from 0.5 to 5 mm.

9. The apparatus of claim 1, further comprising a plurality of temperature measurement points connected to the drawing tank.

10. The apparatus of claim 9, further comprising a feedback control unit, wherein the plurality of temperature measurement points comprises at least two temperature feedback control measurement points in communication with the feedback control unit so that the feedback control unit regulates a heating power of the direct and/or indirect heater.

11. The apparatus of claim 1, wherein the heating element comprises heating tiles or meandering heaters.

12. The apparatus of claim 1, wherein the heating element comprises a resistance heating material selected from a group consisting of platinum, stainless steel, and SiC.

13. The apparatus of claim 1, wherein the drawing tank comprises a fine grain stabilized noble metal or metal alloy.

14. The apparatus of claim 13, wherein the fine grain stabilized noble metal or metal alloy is a metal selected from a group consisting of Pt, PtRh, PtAu, PtRhAu, PtIr, $ZrO_2$ particles.

15. An apparatus for producing thin glass ribbons from a molten glass, the apparatus comprising:
a drawing tank having a manifold pipe, a wall, and a nozzle opening through the wall, the manifold pipe having an upper portion with a cylindrical cross-section that is transverse to a drawing direction of the thin glass ribbons and along a longitudinal extension of the nozzle opening, the nozzle opening being configured to allow the molten glass to exit the drawing tank and produce the thin glass ribbons with a thickness up to 3000 μm;
a direct heater having a heating circuit and a power source, the heating circuit defining a first heating zone to heat the drawing tank, the power source operatively connected to the heating circuit, the heating circuit having power connections that connect the heating circuit to the manifold pipe so that a current from the power source flows through a current-carrying portion of the manifold pipe to heat the manifold pipe, the power connections comprising a pair of collars fitted to the upper portion of the manifold pipe; and
an indirect heater having a heating element arranged around the drawing tank and defining a second heating zone to heat the drawing tank, wherein the apparatus is configured so that more than 50% of a total heating power output is provided by the indirect heater and is configured so that the indirect heater is positioned to heat at least the drawing tank at the nozzle opening.

16. An apparatus for producing thin glass ribbons from a molten glass, the apparatus comprising:
a drawing tank having a manifold pipe, a wall, and a nozzle opening through the wall, the manifold pipe having an upper portion with a cylindrical cross-section that is transverse to a drawing direction of the thin glass ribbons and along a longitudinal extension of the nozzle opening, the nozzle opening being configured to allow the molten glass to exit the drawing tank and produce the thin glass ribbons with a thickness up to 3000 μm;
a direct heater having a heating circuit and a power source, the heating circuit defining a first heating zone to heat the drawing tank, the power source operatively connected to the heating circuit, the heating circuit having power connections that connect the heating circuit to the manifold pipe so that a current from the power source flows through a current-carrying portion of the manifold pipe to heat the manifold pipe, the power connections comprising a pair of collars fitted to the upper portion of the manifold pipe;
an indirect heater having a heating element defining a second heating zone to heat the drawing tank; and
a plurality of temperature measurement points connected to the drawing tank, wherein at least two of the plurality of temperature measurement points are positively connected to the drawing tank.

17. The apparatus of claim 16, further comprising a feedback control unit, wherein the plurality of temperature measurement points comprises at least two temperature feedback control measurement points in communication with the feedback control unit so that the feedback control unit regulates a heating power of the direct and/or indirect heaters.

18. The apparatus of claim 16, wherein the at least two of the plurality of temperature measurement points that are positively connected to the drawing tank are welded to the drawing tank.

19. The apparatus according to claim 16, wherein the nozzle opening is configured to produce the thin glass ribbons with the thickness between 15 and 1100 μm.

20. An apparatus for producing thin glass ribbons from a molten glass, the apparatus comprising:
a drawing tank having an inlet for the molten glass, a wall and a nozzle opening through the wall, wherein the drawing tank has an upper portion transversely to the drawing direction of the glass ribbon, that is along the longitudinal extension of the nozzle opening and wherein the nozzle opening being configured to allow the molten glass to exit the drawing tank and produce the thin glass ribbons with a thickness up to 3000 μm;
a direct heater having a heating circuit and a power source, the heating circuit defining a first heating zone to heat the drawing tank, the power source operatively connected to the heating circuit, the heating circuit having power connections that connect the heating circuit to the wall so that a current from the power source flows through a current-carrying portion of the wall to heat the wall;
an indirect heater having a heating element defining a second heating zone to heat the drawing tank, wherein the direct heater comprises a plurality of heating circuits defining a plurality of the first heating zones arranged on and around the drawing tank in a horizontally distributed manner, wherein the drawing tank comprises collars as the power connections for direct conductive heating.

\* \* \* \* \*